US012311564B2

(12) United States Patent
Lin et al.

(10) Patent No.: US 12,311,564 B2
(45) Date of Patent: May 27, 2025

(54) ELECTRIC HAIR CLIPPER WITH TEMPERATURE CHANGING FUNCTION

(71) Applicant: Ningbo Kaili Holding Group Co., Ltd, Zhejiang (CN)

(72) Inventors: Jian Lin, Zhejiang (CN); Zongyue Chen, Zhejiang (CN)

(73) Assignee: Ningbo Kaili Holding Group Co., Ltd, Ningbo (CN)

(*) Notice: Subject to any disclaimer, the term of this patent is extended or adjusted under 35 U.S.C. 154(b) by 452 days.

(21) Appl. No.: 18/048,029

(22) Filed: Oct. 20, 2022

(65) Prior Publication Data

US 2023/0130022 A1 Apr. 27, 2023

(30) Foreign Application Priority Data

Oct. 22, 2021 (CN) ......................... 202122553805.7
Oct. 22, 2021 (CN) ......................... 202122553821.6
Oct. 22, 2021 (CN) ......................... 202122554550.6

(51) Int. Cl.
*B26B 19/38* (2006.01)
*B26B 19/06* (2006.01)

(52) U.S. Cl.
CPC .......... *B26B 19/3873* (2013.01); *B26B 19/06* (2013.01)

(58) Field of Classification Search
CPC ... B26B 19/06; B26B 19/382; B26B 19/3846; B26B 19/3873; B26B 19/28; B26B 19/386
See application file for complete search history.

(56) References Cited

U.S. PATENT DOCUMENTS

2015/0367521 A1* 12/2015 Toy ....................... B26B 19/386 30/123

FOREIGN PATENT DOCUMENTS

CN 111590644 A * 8/2020
CN 213165485 U * 5/2021
WO WO-2010033399 A2 * 3/2010 ............. B26B 19/06

* cited by examiner

*Primary Examiner* — Jennifer S Matthews

(57) ABSTRACT

The present disclosure provides an electric hair clipper with a temperature changing function, including a machine body and a cutter head, a heat transfer structure for heating and refrigerating is disposed in the machine body, and the heat transfer structure and the fixed cutter fixing member are connected to each other in a manner of heat conduction; or a refrigerating structure is disposed in the machine body, which is connected to the fixed cutter fixing member in a manner of heat conduction; or a heating structure is disposed in the machine body, which is connected to the fixed cutter fixing member in a manner of heat conduction. The heat transfer structure and the fixed cutter fixing member are connected to each other in a manner of heat conduction, so that the temperature of the fixed cutter fixing member can change directly, and the overall heat transfer energy loss is small.

20 Claims, 5 Drawing Sheets

ELECTRIC HAIR CLIPPER WITH TEMPERATURE CHANGING FUNCTION

CROSS REFERENCE TO RELATED APPLICATIONS

The present application claims the benefit of Chinese Patent Application Nos. 202122554550.6, 202122553821.6 and 202122553805.7 filed on Oct. 22, 2021. All the above are hereby incorporated by reference in their entirety.

TECHNICAL FIELD

The present disclosure relates to the technical field of hair trimmers, and particularly relates to an electric hair clipper with a temperature changing function.

BACKGROUND

The cutter head of an electric hair clipper includes a fixed cutter and a movable cutter. The movable cutter can reciprocate with respect to the fixed cutter. When hair is cut, the fixed cutter is in direct contact with the skin, and the movable cutter reciprocates to cut off the hair inserted into the fixed cutter. With the progress of the economic society, more and more people pay more attention to the experience of using electric hair clippers, such as heating and refrigerating functions of the electric hair clippers. For the electric hair clippers in the market, a temperature changing body is generally in direct contact with the fixed cutter to transfer heat. However, because the fixed cutter is mostly made of an iron material, the energy loss of heat transfer between the temperature changing body and the fixed cutter is large, resulting in a poor heat transfer effect.

SUMMARY

In order solve the above-mentioned problems in at least one aspect, the present disclosure provides an electric hair clipper with a temperature changing function, including a machine body and a cutter head connected to each other, the cutter head including a movable cutter, a fixed cutter and a fixed cutter fixing member, a driving assembly for driving the movable cutter to reciprocate being disposed in the machine body, the fixed cutter being connected to the machine body through the fixed cutter fixing member, and the fixed cutter fixing member being adapted to be in direct contact with the scalp of a user when hair is cut; a heat transfer structure for heating and refrigerating being further disposed in the machine body, and the heat transfer structure and the fixed cutter fixing member being connected to each other in a manner of heat conduction; or a refrigerating structure being further disposed in the machine body, and the refrigerating structure and the fixed cutter fixing member being connected to each other in a manner of heat conduction; or a heating structure being further disposed in the machine body, and the heating structure and the fixed cutter fixing member being connected to each other in a manner of heat conduction.

Optionally, the fixed cutter fixing member and the fixed cutter are connected to each other in a manner of heat conduction.

Optionally, the fixed cutter fixing member includes a skin-contacting portion and connecting portions, which are connected to each other, the fixed cutter is provided with a hollowed-out portion for mounting the skin-contacting portion, the fixed cutter fixing member is separately connected to the fixed cutter and the machine body through the connecting portions, and the skin-contacting portion and the heat transfer structure are connected to each other in a manner of heat conduction; or, the skin-contacting portion and the refrigerating structure are connected to each other in a manner of heat conduction; or, the skin-contacting portion and the heating structure are connected to each other in a manner of heat conduction.

Optionally, the machine body is provided with sliding rails, and each of the connecting portions is provided with a sliding block cooperating with the corresponding sliding rail; and a tap position adjusting assembly for adjusting mutual positions between the sliding block and the sliding rail is further disposed.

Optionally, the fixed cutter fixing member is made of an aluminum material.

Optionally, the heat transfer structure includes a circuit board and a heating and refrigerating body electrically connected to the circuit board, and the heating and refrigerating body is connected to the fixed cutter fixing member in a manner of heat conduction.

Optionally, a conductive sheet is disposed between the heating and refrigerating body and the fixed cutter fixing member, and the heating and refrigerating body, the conductive sheet and the fixed cutter fixing member are connected in a manner of heat conduction in sequence.

Optionally, the conductive sheet is an aluminum block, the heat transfer structure further includes a copper sheet, and the copper sheet is disposed between the conductive sheet and the heating and refrigerating body.

Optionally, the circuit board is provided with a current direction switching unit for controlling the heating and refrigerating body to switch between heating work and refrigerating work; or, the heating and refrigerating body includes a heating semiconductor and a refrigerating semiconductor, and the heating semiconductor and the refrigerating semiconductor are separately controlled by the circuit board to perform the heating work and the refrigerating work.

Optionally, the driving assembly includes a driving motor and an eccentric wheel connected to the driving motor, the eccentric wheel is connected to the movable cutter, and a battery for supplying power to the circuit board and the driving motor is disposed in the machine body.

Optionally, the refrigerating structure includes a first circuit board and a refrigerating body electrically connected to the first circuit board, and the refrigerating body is connected to the fixed cutter fixing member in a manner of heat conduction.

Optionally, a first conductive sheet is disposed between the refrigerating body and the fixed cutter fixing member, and the refrigerating body, the first conductive sheet and the fixed cutter fixing member are connected in a manner of heat conduction in sequence.

Optionally, the first conductive sheet is an aluminum block, the refrigerating structure further includes a first copper sheet, and the first copper sheet is disposed between the first conductive sheet and the refrigerating body.

Optionally, the refrigerating body is a refrigerating semiconductor, and the refrigerating semiconductor is controlled by the first circuit board to perform refrigerating work; and a first heat dissipation member is connected to the refrigerating semiconductor.

Optionally, the driving assembly includes a driving motor and an eccentric wheel connected to the driving motor, the eccentric wheel is connected to the movable cutter, and a battery for supplying power to the first circuit board and the driving motor is disposed in the machine body.

Optionally, the heating structure includes a second circuit board and a heating body electrically connected to the second circuit board, and the heating body is connected to the fixed cutter fixing member in a manner of heat conduction.

Optionally, a second conductive sheet is disposed between the heating body and the fixed cutter fixing member, and the heating body, the second conductive sheet and the fixed cutter fixing member are connected in a manner of heat conduction in sequence.

Optionally, the second conductive sheet is an aluminum block, the heating structure further includes a second copper sheet, and the second copper sheet is disposed between the second conductive sheet and the heating body.

Optionally, the heating body is a heating semiconductor, and the heating semiconductor is controlled by the second circuit board to perform heating work.

Optionally, the driving assembly includes a driving motor and an eccentric wheel connected to the driving motor, the eccentric wheel is connected to the movable cutter, and a battery for supplying power to the second circuit board and the driving motor is disposed in the machine body.

Compared with the prior art, according to the electric hair clipper with a temperature changing function in the present disclosure, the heat transfer structure with heating and refrigerating functions or the refrigerating structure with only a refrigerating function or the heating structure with only a heating function is disposed in the machine body, and the heat transfer structure is connected with the fixed cutter fixing member in the manner of direct heat conduction, so that the temperature of the fixed cutter fixing member which is in direct contact with the scalp of a user when hair is cut changes with the change of the temperature of the heat transfer structure, thereby enabling the user to start the heating function during use in the cold winter, at this time, the warm fixed cutter fixing member can reduce the feeling of coldness when the electric hair clipper is in contact with the scalp for the first time, and the electric hair clipper is pre-heated, which can reduce the irritation during hair cutting. The refrigerating function can be started when heat is generated due to reciprocating friction between the movable cutter and the fixed cutter in the hair-cutting process, and at this time, heat is dissipated through the cold fixed cutter fixing member, so as to avoid pulling hair during hair cutting as much as possible when friction heating between the movable cutter and the fixed cutter is too fast. Due to this structural design, the fixed cutter fixing member connected with the heat transfer structure in the manner of heat conduction is in direct contact with the scalp, so that the energy loss is low during overall heat transfer to ensure the heat transfer effect.

Figure 1:
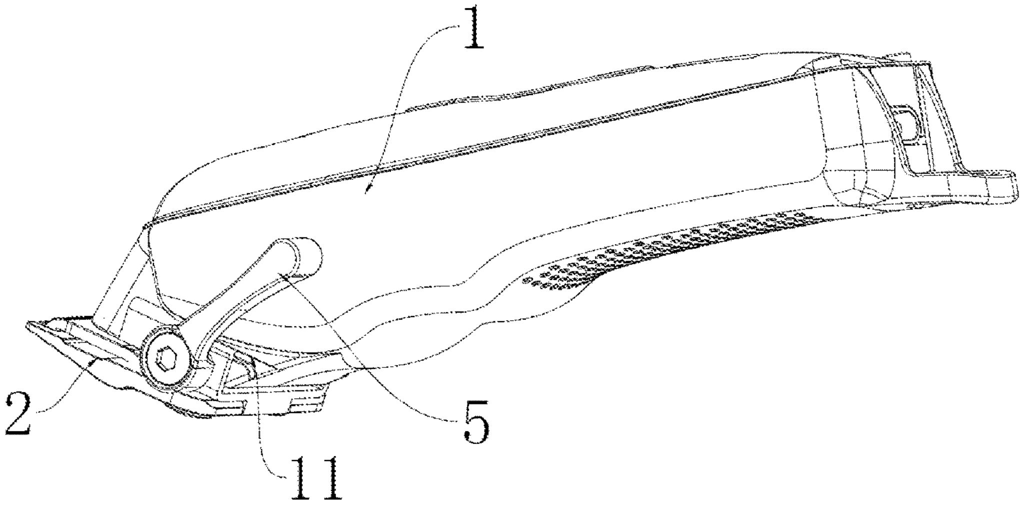
FIG. 1 is a structural diagram of an electric hair clipper according to an embodiment of the present disclosure.

List of Reference Numerals:

1, machine body; 11, sliding rail; 2, cutter head; 21, movable cutter; 22, fixed cutter; 221, hollowed-out portion; 23, fixed cutter fixing member; 231, skin-contacting portion; 232, connecting portion; 2321, sliding block; 3, driving assembly; 31, driving motor; 32, eccentric wheel; 4, heat transfer structure; 41, circuit board; 42, heating and refrigerating body; 43, conductive sheet; 44, copper sheet; 45, heat dissipation member; 5, tap position adjusting assembly; 6, battery; 7, starting switch; 8, refrigerating structure; 81, first circuit board; 82, refrigerating body; 83, first conductive sheet; 84, first copper sheet; 85, first heat dissipation member; 9, heating structure; 91, second circuit board; 92, heating body; 93, second conductive sheet; and 94, second copper sheet.

DETAILED DESCRIPTION

To make the above-mentioned objects, features and advantages of the present disclosure more comprehensible, detailed description is made to specific embodiments of the present disclosure below with reference to the accompanying drawings.

In describing the present disclosure, it is to be understood that the terms “upper”, “lower”, and the like, refer to an orientation or positional relationship based on the normal use of the product.

The terms “first” and “second” are used for descriptive purposes only and are not to be construed as indicating or implying relative importance or implicitly indicating the number of technical features indicated. Therefore, a feature restricted by “first” or “second” may explicitly indicate or implicitly include at least one of such features.

Figure 2:
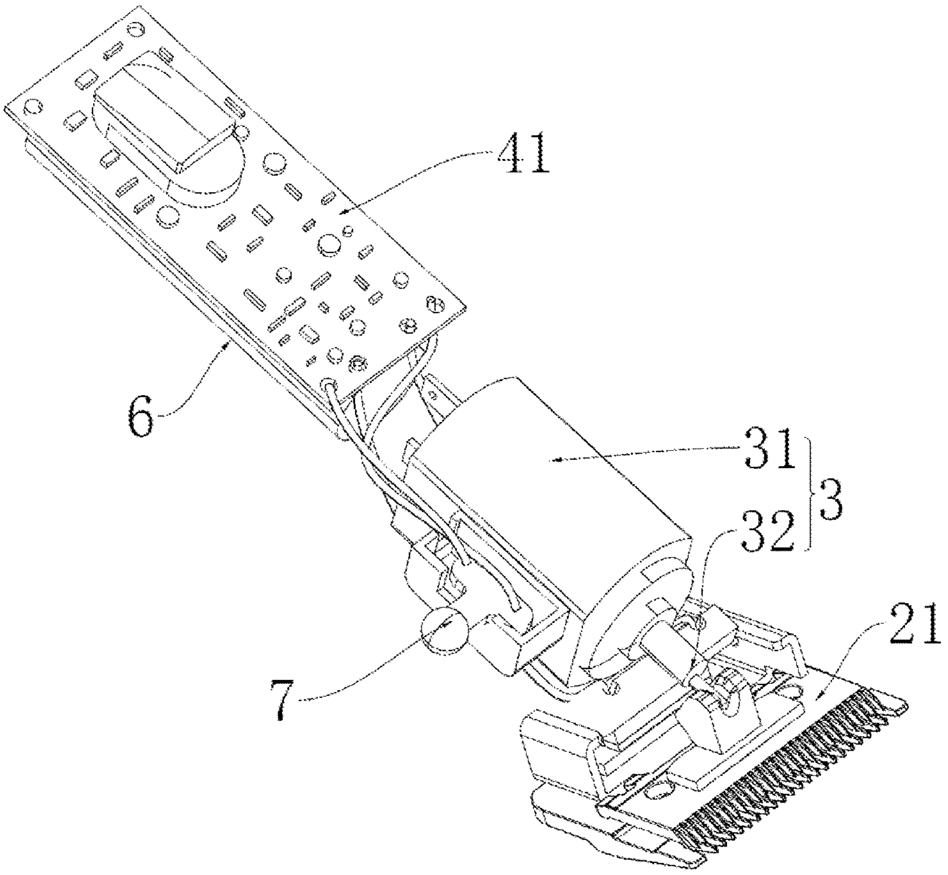
FIG. 2 is a partial structural diagram I of the electric hair clipper according to the embodiment of the present disclosure.
Figure 3:
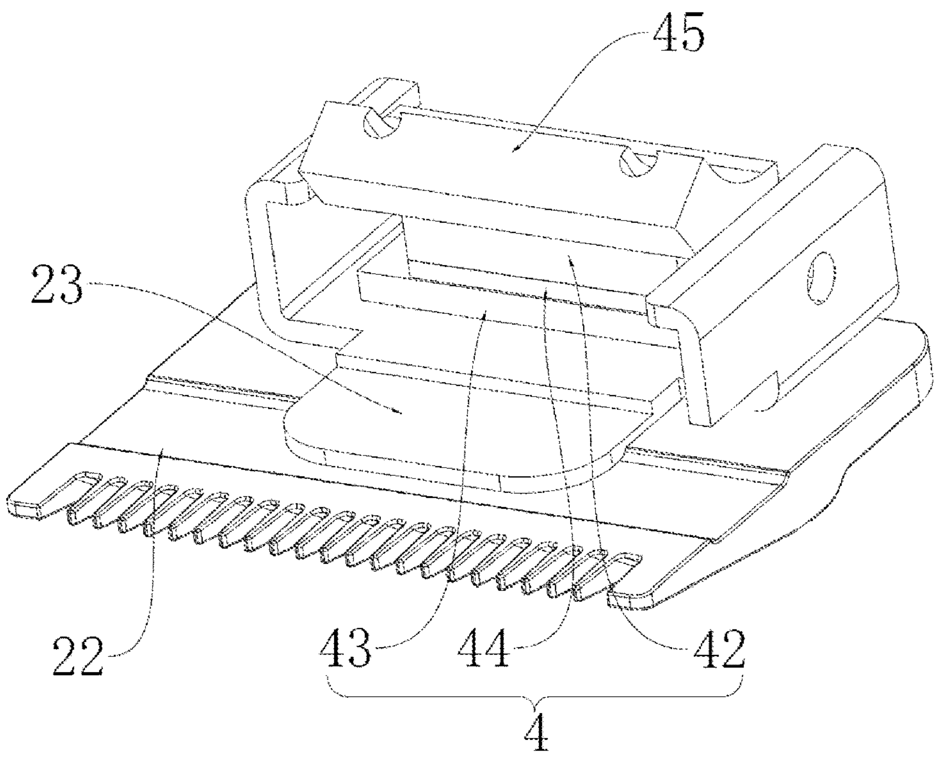
FIG. 3 is a partial structural diagram II of the electric hair clipper according to the embodiment of the present disclosure.

An embodiment of the present disclosure provides an electric hair clipper with a temperature changing function. In combination with what is shown in FIG. 1, FIG. 2 and FIG. 3, the electric hair clipper includes a machine body 1 and a cutter head 2 connected to each other. The cutter head 2 includes a movable cutter 21, a fixed cutter 22 and a fixed cutter fixing member 23. A driving assembly 3 for driving the movable cutter 21 to reciprocate is disposed in the machine body 1. The fixed cutter 22 is connected to the machine body 1 through the fixed cutter fixing member 23. The fixed cutter fixing member 23 is adapted to be in direct contact with the scalp of a user when hair is cut. A heat transfer structure 4 for heating and refrigerating is further disposed in the machine body 1. The heat transfer structure 4 and the fixed cutter fixing member 23 are connected to each other in a manner of heat conduction.

The fixed cutter fixing member 23 is made of a heat-conducting material, preferably made of an aluminum material. Aluminum is light in weight and low in cost, cannot be easily oxidized, and has a better heat-conducting property. In addition, other materials with a good heat-conducting property may also be selected. The machine body 1 is used for being held when hair of the user is cut. The cutter head 2 is mounted at the front end of the machine body 1. The machine body 1 is generally made of an insulating material such as plastic. The heat transfer structure 4 may be controlled to perform heating and refrigerating work separately, and the specific work may be selected according to the requirements of the user. The temperature of the fixed cutter fixing member 23 may change along with the change of the temperature of the heat transfer structure 4, so that the fixed cutter fixing member 23 may raise the temperature or lower the temperature by means of heating or refrigerating of the heat transfer structure 4.

According to the electric hair clipper with a temperature changing function in this embodiment, the heat transfer structure 4 with heating and refrigerating functions is disposed in the machine body 1, and the heat transfer structure 4 is connected with the fixed cutter fixing member 23 in the manner of direct heat conduction, so that the temperature of the fixed cutter fixing member 23 which is in direct contact with the scalp of the user when hair is cut changes with the change of the temperature of the heat transfer structure 4, thereby enabling the user to start the heating function during use in the cold winter, at this time, the warm fixed cutter fixing member 23 can reduce the feeling of coldness when the electric hair clipper is in contact with the scalp for the first time, and the electric hair clipper is pre-heated, which can reduce the irritation during hair cutting. The refrigerating function can be started when heat is generated due to reciprocating friction between the movable cutter 21 and the fixed cutter 22 in the hair-cutting process, and at this time, heat is dissipated through the cold fixed cutter fixing member 23, so as to avoid pulling hair during hair cutting as much as possible when friction heating between the movable cutter 21 and the fixed cutter 22 is too fast. Due to this structural design, the fixed cutter fixing member 23 connected with the heat transfer structure 4 in the manner of heat conduction is in direct contact with the scalp, so that the energy loss is low during overall heat transfer to ensure the heat transfer effect.

Optionally, in combination with what is shown in FIG. 3, the fixed cutter fixing member 23 and the fixed cutter 22 are connected to each other in a manner of heat conduction.

The fixed cutter 22 is made of a heat-conducting material, preferably made of an iron material, and has a certain anti-deformation strength so as to cooperate with the movable cutter 21 to perform a hair-cutting operation. The surface of the fixed cutter 22 will be generally in contact with the scalp during hair-cutting. In this embodiment, the fixed cutter fixing member 23 is connected to the fixed cutter 22 in a manner of heat conduction. Thus, on one hand, the fixed cutter fixing member 23 may be in direct contact with the skin to give the skin a warm or cool feeling, and on the other hand, energy may be transmitted to the fixed cutter 22 to change the temperature of the fixed cutter 22, with a dual effect.

Optionally, in combination with what is shown in FIG. 2 to FIG. 5, the fixed cutter fixing member 23 includes a skin-contacting portion 231 and connecting portions 232, which all connected to each other. The fixed cutter 22 is provided with a hollowed-out portion 221 for mounting the skin-contacting portion 231. The fixed cutter fixing member 23 is separately connected to the fixed cutter 22 and the machine body 1 through the connecting portions 232. The skin-contacting portion 231 and the heat transfer structure 4 are connected to each other in a manner of heat conduction.

The skin-contacting portion 231 is of a boss structure. The hollowed-out portion 221 matches the shape of the skin-contacting portion 231. When the skin-contacting portion 231 is mounted to the hollowed-out portion 221, the outer surface of the skin-contacting portion 231 is flush with the outer surface of the fixed cutter 22. The outer surfaces here refer to surfaces in contact with the scalp, so that the fixed cutter 22 may slide smoothly relative to the scalp during hair cutting. In this embodiment, the hollowed-out portion 221 for mounting the skin-contacting portion 231 is disposed on the fixed cutter 22 so as to make full use of the space of the fixed cutter 22, so that the overall structure is compact and the space occupied is as small as possible.

Figure 4:
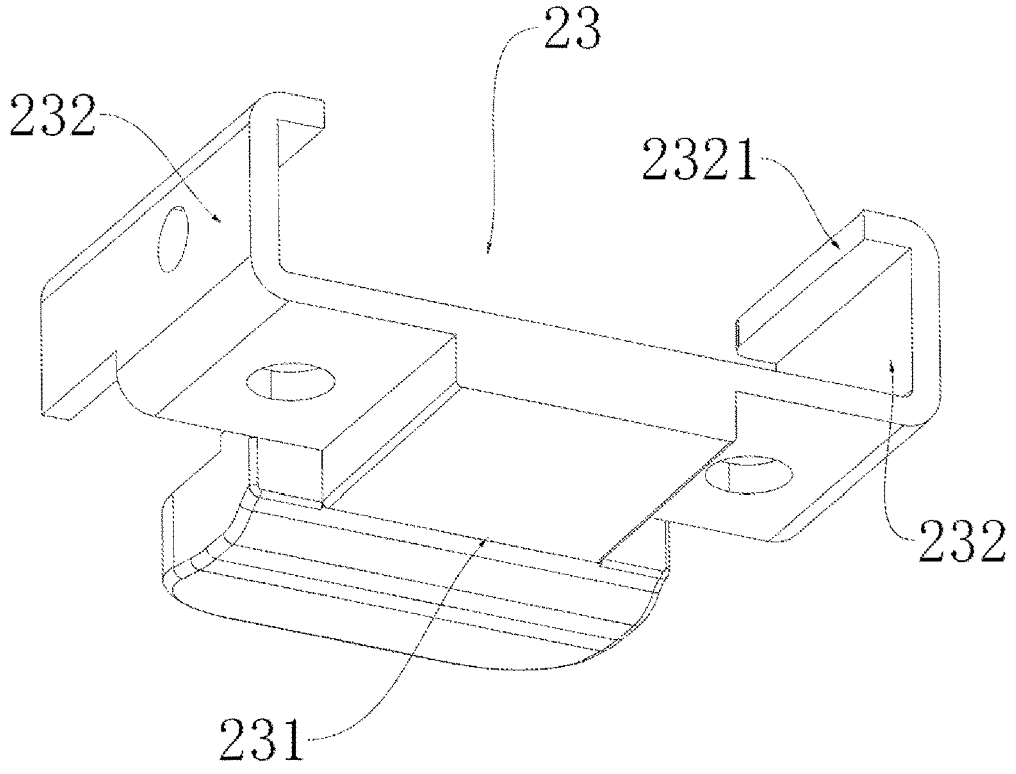
FIG. 4 is a structural diagram of a fixed cutter fixing member according to the embodiment of the present disclosure.
Figure 5:
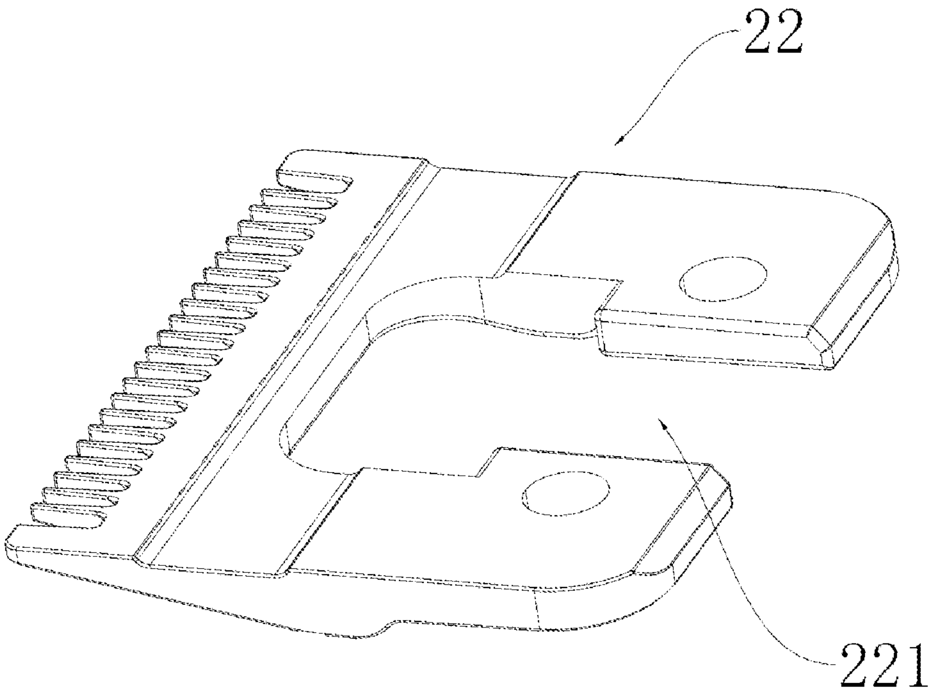
FIG. 5 is a structural diagram of a fixed cutter according to the embodiment of the present disclosure.

Optionally, in combination with what is shown in FIG. 1 and FIG. 4, the machine body 1 is provided with sliding rails 11. Each of the connecting portions 232 is provided with a sliding block 2321 cooperating with the corresponding sliding rail 11. A tap position adjusting assembly 5 for adjusting mutual positions between the sliding block 2321 and the sliding rail 11 is further disposed.

The left and right sides of the skin-contacting portion 231 are respectively connected with the connecting portions 232. Each of the connecting portion 232 is of an L-shaped plate-shaped structure and includes a first connecting plate and a second connecting plate which are integrally formed. The first connecting plate is connected with the skin-contacting portion 231. The first connecting portion 232 is fixed to the fixed cutter 22 via a screw. The left and right sides of the machine body 1 are each provided with the sliding rail 11. The sliding block 2321 protrudes from the inner side wall of the second connection plate. The tap position adjusting assembly 5 includes an adjuster and a locking screw which are connected to each other. When the adjuster is adjusted to release the locking screw, the fixed cutter 22 may adjust the relative position with respect to the machine body 1 through the movement of the sliding block 2321 in the track. When the adjuster locks the locking screw, the relative position of the fixed cutter 22 with respect to the machine body 1 is fixed, so as to adjust the relative position of the fixed cutter 22 with respect to the movable cutter 21, so as to meet the requirements of different hair cutting lengths.

Optionally, in combination with what is shown in FIG. 2 and FIG. 3, the heat transfer structure 4 includes a circuit board 41 and a heating and refrigerating body 42 electrically connected to the circuit board 41. The heating and refrigerating body 42 is connected to the fixed cutter fixing member 23 in a manner of heat conduction.

When it is necessary to heat the fixed cutter fixing member 23, the circuit board 41 controls the heating and refrigerating body 42 to perform heating work. When a certain temperature is reached, the energy on the heating and refrigerating body 42 is conducted to the fixed cutter fixing member 23, so that the temperature of the fixed cutter fixing member 23 rises. Similarly, when it is required to cool down the fixed cutter fixing member 23, the circuit board 41 controls the heating and refrigerating body 42 to perform refrigerating work. When the temperature is lowered to a certain degree, the energy on the fixed cutter fixing member 23 is absorbed onto the heating and refrigerating body 42, so that the temperature of the fixed cutter fixing member 23 decreases.

Optionally, in combination with what is shown in FIG. 2 and FIG. 3, a conductive sheet 43 is disposed between the heating and refrigerating body 42 and the fixed cutter fixing member 23. The heating and refrigerating body 42, the conductive sheet 43 and the fixed cutter fixing member 23 are connected in a manner of heat conduction in sequence.

The conductive sheet 43 is in abutting connection with the fixed cutter fixing member 23. The contact surface of the conductive sheet is completely in contact with the surface of the fixed cutter fixing member 23, so as to reduce the heat transfer loss as much as possible.

Optionally, in combination with what is shown in FIG. 2 and FIG. 3, the conductive sheet 43 is an aluminum block. The heat transfer structure 4 further includes a copper sheet 44. The copper sheet 44 is disposed between the conductive sheet 43 and the heating and refrigerating body 42.

The conductive sheet 43 is preferably an aluminum block made of an aluminum material. Aluminum is light in weight and low in cost, cannot be easily oxidized, and has a better heat-conducting property. In addition, other materials with a good heat-conducting property may also be selected. The material of the copper sheet 44 is copper. The copper sheet 44 is generally rectangular or circular, with a low cost. In addition, other materials with a good heat-conducting property may also be selected. The copper sheet 44 has a very good heat conduction effect, and the copper sheet 44 is relatively soft, has certain ductility, and may be extended and deformed under the mutual extrusion of the conductive sheet 43 and the heating and refrigerating body 42, so that the contact area between the two side surfaces of the copper sheet 44 and the conductive sheet 43 and the heating and refrigerating body 42 is as large as possible, so as to compensate for the uneven surface of the aluminum block in the actual processing and prevent the energy loss in the transfer process, thereby ensuring a better overall heat conduction effect and improving the energy transfer efficiency.

Optionally, in combination with what is shown in FIG. 2, the circuit board 41 is provided with a current direction switching unit for controlling the heating and refrigerating body 42 to switch between heating work and refrigerating work.

The heating and refrigerating body 42 is a semiconductor. The semiconductor is electrically connected to the current direction switching unit. The current direction switching unit controls the current direction of the semiconductor according to a refrigerating or heating command received by the circuit board 41. If heating is required, a current passing through the semiconductor is controlled to be a forward current, so that the semiconductor generates heat. If refrigerating is required, a current passing through the semiconductor is controlled to be a reverse current, so that the semiconductor performs refrigeration. The heating and refrigerating body 42 may perform heating work and refrigerating work separately under the control of the circuit board 41, and may be specifically realized by changing the current flow direction of the semiconductor through the current direction switching unit. This structural design can save the mounting space and omit mounting steps as much as possible. When it is necessary to heat the fixed cutter fixing member 23, the circuit board 41 controls the heating and refrigerating body 42 to perform heating work. When a certain temperature is reached, the energy on the heating and refrigerating body 42 is conducted to the conductive sheet 43. The temperature of the conductive sheet 43 rises. Energy on the conductive sheet 43 is then transferred to the fixed cutter fixing member 23. Finally the temperature of the fixed cutter fixing member 23 rises. Similarly, when it is necessary to lower the temperature of the fixed cutter fixing member 23, the circuit board 41 controls the heating and refrigerating body 42 to perform refrigerating work. When the temperature is lowered to a certain degree, the energy on the conductive sheet 43 is absorbed onto the heating and refrigerating body 42. The temperature of the conductive sheet 43 is lowered. The energy on the fixed cutter fixing member 23 is absorbed onto the conductive sheet 43 again. Finally the temperature of the fixed cutter fixing member 23 is lowered.

In another embodiment, the heating and refrigerating body 42 includes a heating semiconductor and a refrigerating semiconductor. The heating semiconductor and the refrigerating semiconductor are separately controlled by the circuit board 41 to perform the heating work and the refrigerating work.

The heating of the heating semiconductor and the refrigerating of the refrigerating semiconductor are both the results of applying the thermoelectric effect. The heating semiconductor and the refrigerating semiconductor are formed by connecting two ends of two different semiconductors. When a current passes through the heating semiconductor, heat is generated at one end, and the other end cools down to generate a temperature difference. Namely, one end is heated and the other end is refrigerated. The heating end of the heating semiconductor is connected to the conductive sheet 43. Similarly, when a current passes through the refrigerating semiconductor, heat is generated at one end, and the other end cools down to generate a temperature difference. Namely, one end is heated and the other end is refrigerated. The refrigerating end of the refrigerating semiconductor is connected to the conductive sheet 43. A heat dissipation member 45 is further connected to the heating end of the refrigerating semiconductor so as to prevent the semiconductor from being damaged due to overheating and ensure the service life of the semiconductor. The heat dissipation member 45 is generally made of an aluminum material. The aluminum material is light in weight, low in price and good in heat dissipation effect.

Optionally, in combination with what is shown in FIG. 2 and FIG. 3, the driving assembly 3 includes a driving motor 31 and an eccentric wheel 32 connected to the driving motor 31. The eccentric wheel 32 is connected to the movable cutter 21. A battery 6 for supplying power to the circuit board 41 and the driving motor 31 is disposed in the machine body 1.

The battery 6 is a rechargeable battery 6. The eccentric wheel 32 is connected to a motor shaft of the driving motor 31. When the driving motor 31 works, the eccentric wheel 32 is driven to move. The eccentric wheel 32 drives the movable cutter 21 to perform a reciprocating motion with respect to the fixed cutter 22 so as to achieve a hair cutting operation. The circuit board 41 is electrically connected to the driving motor 31. The circuit board 41 controls the driving motor 31 to work.

Optionally, in combination with what is shown in FIG. 1 and FIG. 2, the machine body 1 is further provided with a starting switch 7 and a temperature control button both connected to the circuit board 41. The temperature control button includes a heating button and a refrigerating button. The refrigerating and heating functions of the electric hair clipper are interchanged by pressing the heating button and the refrigerating button separately.

The starting switch 7 is used for starting or turning off the driving motor 31. The temperature control button may be designed to control the heat transfer structure 4 to perform heating or refrigerating work only after the starting switch 7 is turned on. The temperature control button may also be in an independent control design. That is to say, regardless of the state of the starting switch 7, the temperature control button may be directly pressed to control the heat transfer structure 4 to perform heating or refrigerating work, so that the application range of the electric hair clipper is wider. The starting switch 7, the heating button and the refrigerating button are all exposed and disposed on the surface of a housing of the machine body 1 to facilitate the user's operation.

When it is necessary to heat the fixed cutter fixing member 23, the user presses down the heating button. The circuit board 41 controls the heating and refrigerating body 42 to perform heating work. When a certain temperature is reached, the energy on the heating and refrigerating body 42 is conducted to the copper sheet 44. The copper sheet 44 transfers the energy to the conductive sheet 43. The conductive sheet 43 conducts the energy to the fixed cutter fixing member 23. Finally the temperature of the fixed cutter fixing member 23 rises. Similarly, when it is necessary to lower the temperature of the fixed cutter fixing member 23, the user presses down the refrigerating button. The circuit board 41 controls the heating and refrigerating body 42 to perform refrigerating work. When the temperature is lowered to a certain degree, the energy on the copper sheet 44 is absorbed onto the heating and refrigerating body 42. The temperature of the copper sheet 44 is lowered. The energy of the conductive sheet 43 is absorbed onto the copper sheet 44. The temperature of the conductive sheet 43 is lowered. The energy on the fixed cutter fixing member 23 is then absorbed onto the conductive sheet 43 again. Finally the temperature of the fixed cutter fixing member 23 is lowered.

Figure 6:
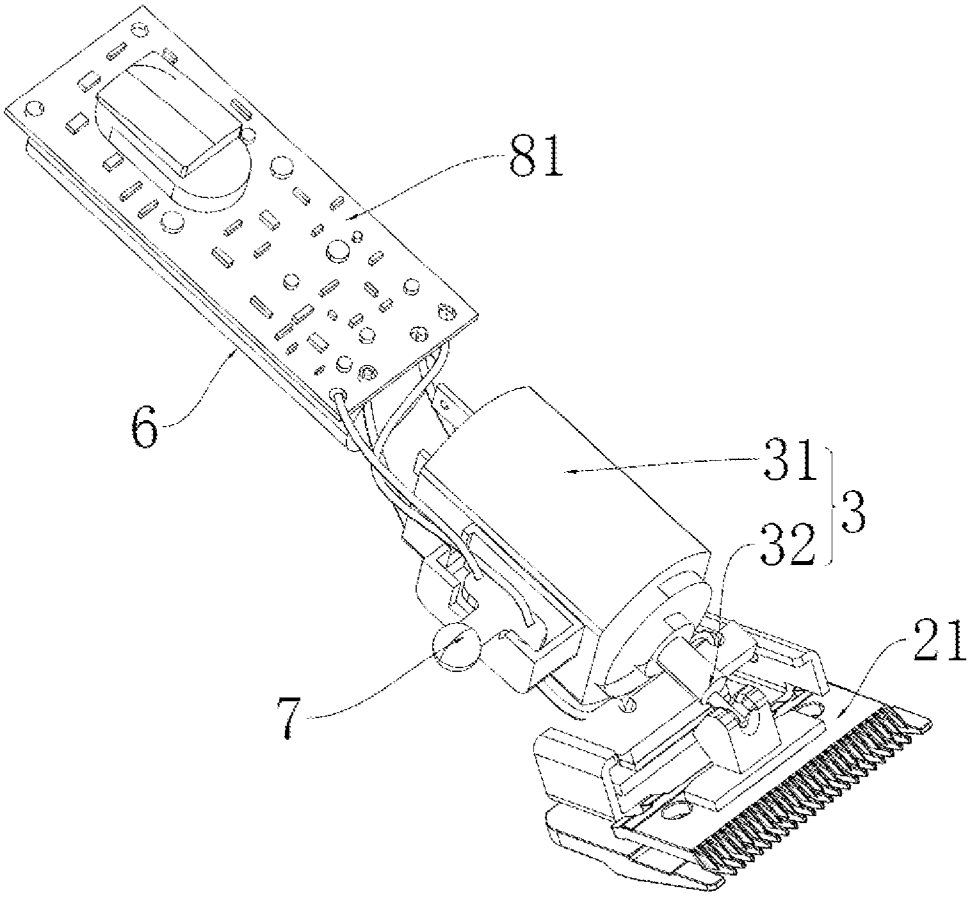
FIG. 6 is a partial structural diagram I of an electric hair clipper with only a refrigerating function according to an embodiment of the present disclosure.
Figure 7:
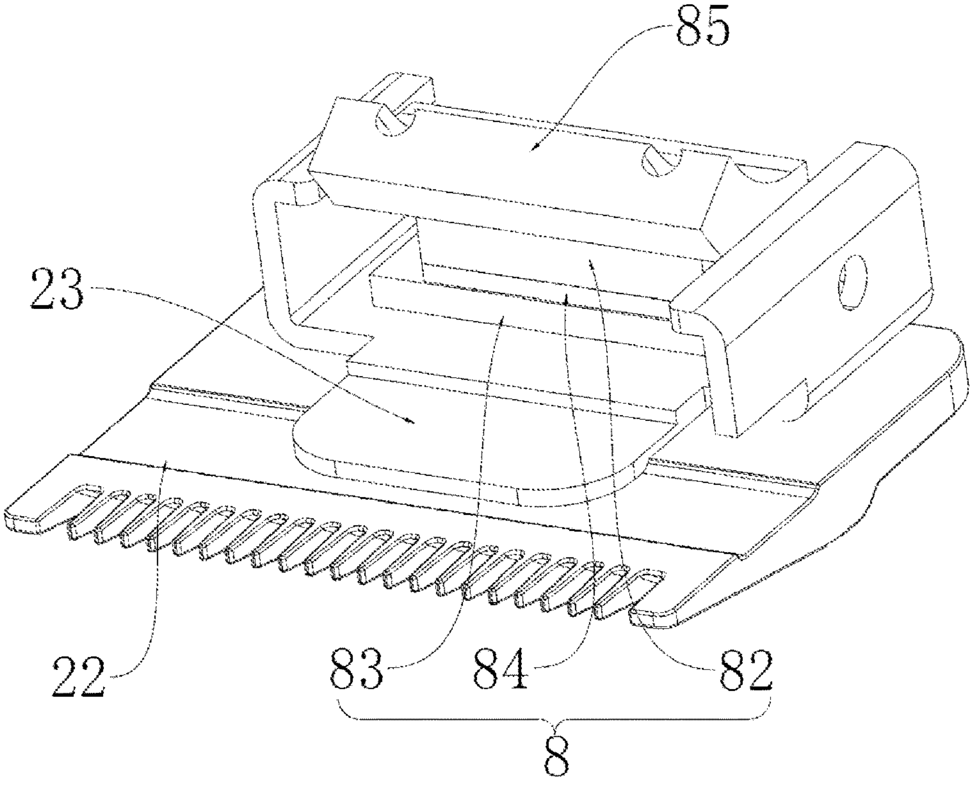
FIG. 7 is a partial structural diagram II of the electric hair clipper with only the refrigerating function according to the embodiment of the present disclosure.

An embodiment of the present disclosure further provides an electric hair clipper with a temperature changing function. In combination with what is shown in FIG. 1, FIG. 6 and FIG. 7, the electric hair clipper includes a machine body 1 and a cutter head 2 connected to each other. The cutter head 2 includes a movable cutter 21, a fixed cutter 22 and a fixed cutter fixing member 23. A driving assembly 3 for driving the movable cutter 21 to reciprocate is disposed in the machine body 1. The fixed cutter 22 is connected to the machine body 1 through the fixed cutter fixing member 23. The fixed cutter fixing member 23 is adapted to be in direct contact with the scalp of a user when hair is cut. A refrigerating structure 8 is further disposed in the machine body 1. The refrigerating structure 8 and the fixed cutter fixing member 23 are connected to each other in a manner of heat conduction.

The fixed cutter fixing member 23 is made of a heat-conducting material, preferably made of an aluminum material. Aluminum is light in weight and low in cost, cannot be easily oxidized, and has a better heat-conducting property. In addition, other materials with a good heat-conducting property may also be selected. The machine body 1 is used for being held when hair of the user is cut. The cutter head 2 is mounted at the front end of the machine body 1. The machine body 1 is generally made of an insulating material such as plastic. The refrigerating structure 8 may be controlled to perform refrigerating work. The temperature of the fixed cutter fixing member 23 may change along with the change of the temperature of the refrigerating structure 8, so that the fixed cutter fixing member 23 may lower temperature by means of refrigerating of the refrigerating structure 8.

According to the electric hair clipper with a temperature changing function in this embodiment, the refrigerating structure 8 with a refrigerating function is disposed in the machine body 1, and the refrigerating structure 8 is connected with the fixed cutter fixing member 23 in a manner of direct heat conduction, so that the temperature of the fixed cutter fixing member 23 which is in direct contact with the scalp of the user when hair is cut changes with the change of the temperature of the refrigerating structure 8, thereby enabling the user to start the refrigerating function when heat is generated due to reciprocating friction between the movable cutter 21 and the fixed cutter 22 during hair cutting, at this time, heat is dissipated through the cold fixed cutter fixing member 23 so as to avoid pulling hair during hair cutting as much as possible when friction heating between the movable cutter 21 and the fixed cutter 22 is too fast. Due to this structural design, the fixed cutter fixing member 23 connected with the refrigerating structure 8 in the manner of heat conduction is in direct contact with the scalp, so that the energy loss is low during overall heat transfer to ensure the heat transfer effect.

Optionally, in combination with what is shown in FIG. 1, FIG. 6 and FIG. 7, the refrigerating structure 8 includes a first circuit board 81 and a refrigerating body 82 electrically connected to the first circuit board 81. The refrigerating body 82 is connected to the fixed cutter fixing member 23 in a manner of heat conduction.

When it is required to cool down the fixed cutter fixing member 23, the first circuit board 81 controls the refrigerating body 82 to perform refrigerating work. When the temperature is lowered to a certain degree, the energy on the fixed cutter fixing member 23 is absorbed onto the refrigerating body 82, so that the temperature of the fixed cutter fixing member 23 decreases.

Optionally, in combination with what is shown in FIG. 1, FIG. 6 and FIG. 7, a first conductive sheet 83 is disposed between the refrigerating body 82 and the fixed cutter fixing member 23. The refrigerating body 82, the first conductive sheet 83 and the fixed cutter fixing member 23 are connected in a manner of heat conduction in sequence.

The first conductive sheet 83 is in abutting connection with the fixed cutter fixing member 23. The contact surface of the first conductive sheet is completely in contact with the surface of the fixed cutter fixing member 23, so as to reduce the heat transfer loss as much as possible.

Optionally, in combination with what is shown in FIG. 7, the first conductive sheet 83 is an aluminum block. The refrigerating structure 8 further includes a first copper sheet 84. The first copper sheet 84 is disposed between the first conductive sheet 83 and the refrigerating body 82.

The first conductive sheet 83 is preferably an aluminum block made of an aluminum material. Aluminum is light in weight and low in cost, cannot be easily oxidized, and has a better heat-conducting property. In addition, other materials with a good heat-conducting property may also be selected. The material of the first copper sheet 84 is copper. The first copper sheet 84 is generally rectangular or circular, with a low cost. In addition, other materials with a good heat-conducting property may also be selected. The first copper sheet 84 has a very good heat conduction effect. The first copper sheet 84 is relatively soft, has certain ductility, and may be extended and deformed under the mutual extrusion of the first conductive sheet 83 and the refrigerating body 82, so that the contact area between the two side surfaces of the first copper sheet 84 and the first conductive sheet 83 and the refrigerating body 82 is as large as possible, so as to compensate for the uneven surface of the aluminum block in the actual processing and prevent the energy loss in the transfer process, thereby ensuring a better overall heat conduction effect and improving the energy transfer efficiency.

Optionally, in combination with what is shown in FIG. 7, the refrigerating body 82 is a refrigerating semiconductor. The refrigerating semiconductor is controlled by the first circuit board 81 to perform refrigerating work.

Refrigerating of the refrigerating semiconductor is a result of applying the thermoelectric effect. When a current passes through the refrigerating semiconductor, heat is generated at one end, and the other end cools down to generate a temperature difference. Namely, one end is heated and the other end is refrigerated. The refrigerating end of the refrigerating semiconductor is connected to the first conductive sheet 83.

Optionally, in combination with what is shown in FIG. 7, a first heat dissipation member 85 is connected to the refrigerating semiconductor.

The first heat dissipation member 85 is connected to the heating end of the refrigerating semiconductor so as to prevent the semiconductor from being damaged due to overheating and ensure the service life of the semiconductor. The first heat dissipation member 85 is generally made of an aluminum material, and the aluminum material is light in weight, low in price and good in heat dissipation effect.

Optionally, in combination with what is shown in FIG. 1, FIG. 6 and FIG. 7, the driving assembly 3 includes a driving motor 31 and an eccentric wheel 32 connected to the driving motor 31. The eccentric wheel 32 is connected to the movable cutter 21. A battery 6 for supplying power to the first circuit board 81 and the driving motor 31 is disposed in the machine body 1.

The battery 6 is a rechargeable battery 6. The eccentric wheel 32 is connected to a motor shaft of the driving motor 31. When the driving motor 31 works, the eccentric wheel 32 is driven to move. The eccentric wheel 32 drives the movable cutter 21 to perform a reciprocating motion with respect to the fixed cutter 22 so as to achieve a hair cutting operation. The first circuit board 81 is electrically connected to the driving motor 31. The first circuit board 81 controls the driving motor 31 to work.

Optionally, in combination with what is shown in FIG. 1 and FIG. 6, the machine body 1 is further provided with a starting switch 7 and a refrigerating button both connected to the first circuit board 81. The refrigerating function of the electric hair clipper is achieved by pressing the refrigerating button.

The starting switch 7 is used for starting or turning off the driving motor 31. The refrigerating button may be designed to control the refrigerating structure 8 to perform refrigerating work only after the starting switch 7 is turned on. The refrigerating button may also be in an independent control design. That is to say, regardless of the state of the starting switch 7, the refrigerating button may be directly pressed to control the refrigerating structure 8 to perform refrigerating work, so that the application range of the electric hair clipper is wider. The starting switch 7 and the refrigerating button are both exposed and disposed on the surface of a housing of the machine body 1 to facilitate the user's operation. When it is necessary to lower the temperature of the fixed cutter fixing member 23, the user presses down the refrigerating button. The first circuit board 81 controls the refrigerating body 82 to perform refrigerating work. When the temperature is lowered to a certain degree, the energy on the first copper sheet 84 is absorbed onto the refrigerating body 82. The temperature of the first copper sheet 84 is lowered. The energy of the first conductive sheet 83 is absorbed onto the first copper sheet 84. The temperature of the first conductive sheet 83 is lowered. The energy on the fixed cutter fixing member 23 is then absorbed onto the first conductive sheet 83 again. Finally the temperature of the fixed cutter fixing member 23 is lowered.

Optionally, in combination with what is shown in FIG. 4, FIG. 5, FIG. 6 and FIG. 7, the fixed cutter fixing member 23 includes a skin-contacting portion 231 and connecting portions 232, which are connected to each other. The fixed cutter 22 is provided with a hollowed-out portion 221 for mounting the skin-contacting portion 231. The fixed cutter fixing member 23 is separately connected to the fixed cutter 22 and the machine body 1 through the connecting portions 232. The skin-contacting portion 231 and the refrigerating structure 8 are connected to each other in a manner of heat conduction.

The skin-contacting portion 231 is of a boss structure. The hollowed-out portion 221 matches the shape of the skin-contacting portion 231. When the skin-contacting portion 231 is mounted to the hollowed-out portion 221, the outer surface of the skin-contacting portion 231 is flush with the outer surface of the fixed cutter 22. The outer surfaces here refer to surfaces in contact with the scalp, so that the fixed cutter 22 may slide smoothly relative to the scalp during hair cutting. In this embodiment, the hollowed-out portion 221 for mounting the skin-contacting portion 231 is disposed on the fixed cutter 22 so as to make full use of the space of the fixed cutter 22, so that the overall structure is compact and the space occupied is as small as possible.

Figure 8:
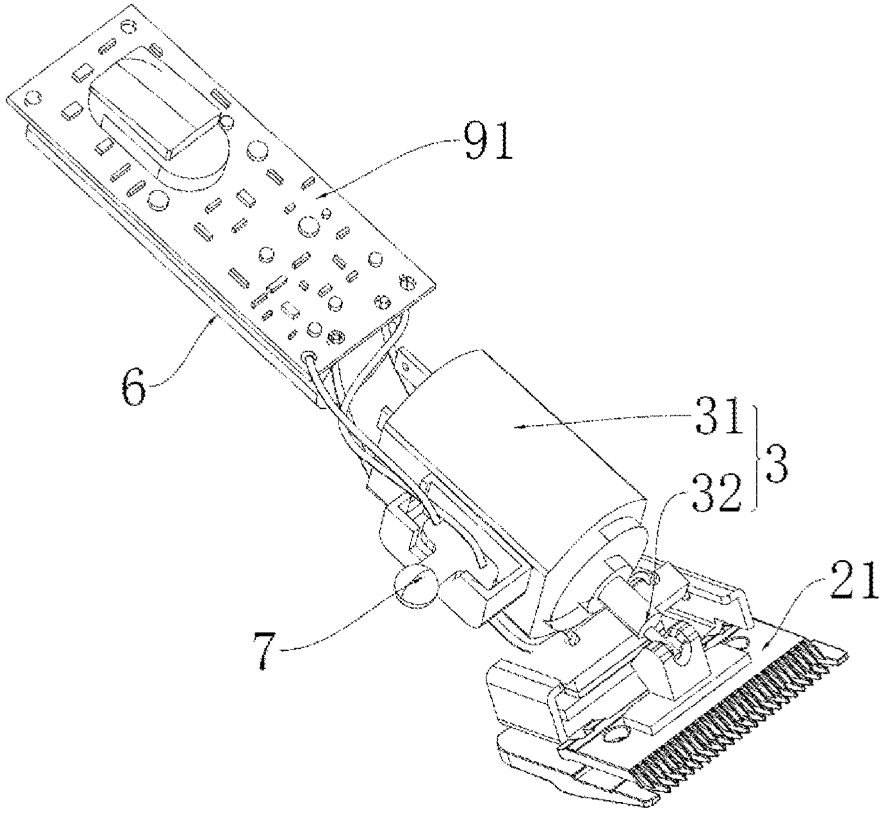
FIG. 8 is a partial structural diagram I of an electric hair clipper with only a heating function according to an embodiment of the present disclosure.
Figure 9:
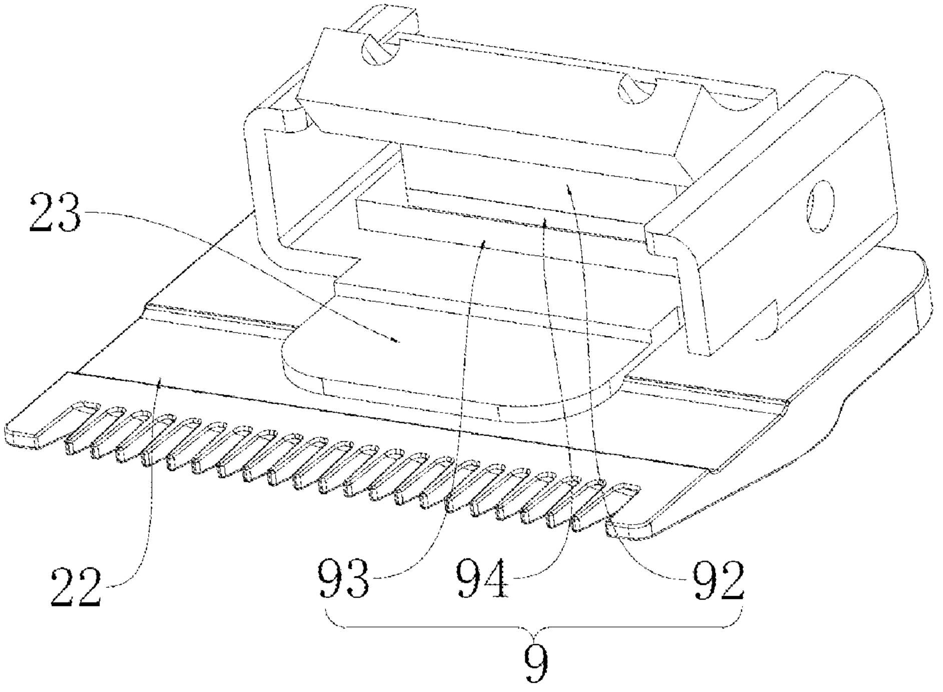
FIG. 9 is a partial structural diagram II of the electric hair clipper with only the heating function according to the embodiment of the present disclosure.

An embodiment of the present disclosure further provides an electric hair clipper with a temperature changing function. In combination with what is shown in FIG. 1, FIG. 8 and FIG. 9, the electric hair clipper includes a machine body 1 and a cutter head 2 connected to each other. The cutter head 2 includes a movable cutter 21, a fixed cutter 22 and a fixed cutter fixing member 23. A driving assembly 3 for driving the movable cutter 21 to reciprocate is disposed in the machine body 1. The fixed cutter 22 is connected to the machine body 1 through the fixed cutter fixing member 23. The fixed cutter fixing member 23 is adapted to be in direct contact with the scalp of a user when hair is cut. A heating structure 9 is further disposed in the machine body 1. The heating structure 9 and the fixed cutter fixing member 23 are connected to each other in a manner of heat conduction.

The fixed cutter fixing member 23 is made of a heat-conducting material, preferably made of an aluminum material. Aluminum is light in weight and low in cost, cannot be easily oxidized, and has a better heat-conducting property. In addition, other materials with a good heat-conducting property may also be selected. The machine body 1 is used for being held when hair of the user is cut. The cutter head 2 is mounted at the front end of the machine body 1. The machine body 1 is generally made of an insulating material such as plastic. The heating structure 9 may be controlled to perform heating work, and the specific work may be selected according to the requirements of the user. The temperature of the fixed cutter fixing member 23 may change along with the change of the temperature of the heating structure 9, so that the fixed cutter fixing member 23 may raise the temperature by means of heating of the heating structure 9.

According to the electric hair clipper with a temperature changing function in this embodiment, the heating structure 9 with a heating function is disposed in the machine body 1, and the heating structure 9 is connected with the fixed cutter fixing member 23 in the manner of direct heat conduction, so that the temperature of the fixed cutter fixing member 23 which is in direct contact with the scalp of the user when hair is cut changes with the change of the temperature of the heating structure 9, thereby enabling the user to start the heating function during use in the cold winter, at this time, the warm fixed cutter fixing member 23 can reduce the feeling of coldness when the electric hair clipper is in contact with the scalp for the first time, and the electric hair clipper is pre-heated, which can reduce the irritation during hair cutting. Due to this structural design, the fixed cutter fixing member 23 connected with the heating structure 9 in the manner of heat conduction is in direct contact with the scalp, so that the energy loss is low during overall heat transfer to ensure the heat transfer effect.

Optionally, in combination with what is shown in FIG. 1, FIG. 8 and FIG. 9, the heating structure 9 includes a second circuit board 91 and a heating body 92 electrically connected to the second circuit board 91. The heating body 92 is connected to the fixed cutter fixing member 23 in a manner of heat conduction.

When it is necessary to heat the fixed cutter fixing member 23, the second circuit board 91 controls the heating body 92 to perform heating work. When a certain temperature is reached, the energy on the heating body 92 is conducted to the fixed cutter fixing member 23, so that the temperature of the fixed cutter fixing member 23 rises.

Optionally, in combination with what is shown in FIG. 9, a second conductive sheet 93 is disposed between the heating body 92 and the fixed cutter fixing member 23. The heating body 92, the second conductive sheet 93 and the fixed cutter fixing member 23 are connected in a manner of heat conduction in sequence.

The second conductive sheet 93 is in abutting connection with the fixed cutter fixing member 23. The contact surface of the second conductive sheet is completely in contact with the surface of the fixed cutter fixing member 23, so as to reduce the heat transfer loss as much as possible.

Optionally, in combination with what is shown in FIG. 9, the second conductive sheet 93 is an aluminum block. The heating structure 9 further includes a second copper sheet 94. The second copper sheet 94 is disposed between the second conductive sheet 93 and the heating body 92.

The second conductive sheet 93 is preferably an aluminum block made of an aluminum material. Aluminum is light in weight and low in cost, cannot be easily oxidized, and has a better heat-conducting property. In addition, other materials with a good heat-conducting property may also be selected. The material of the second copper sheet 94 is copper. The second copper sheet 94 is generally rectangular or circular, with a low cost. In addition, other materials with a good heat-conducting property may also be selected. The second copper sheet 94 has a very good heat conduction effect, and the second copper sheet 94 is relatively soft, has certain ductility, and may be extended and deformed under the mutual extrusion of the second conductive sheet 93 and the heating body 92, so that the contact area between the two side surfaces of the second copper sheet 94 and the second conductive sheet 93 and the heating body 92 is as large as possible, so as to compensate for the uneven surface of the aluminum block in the actual processing and prevent the energy loss in the transfer process, thereby ensuring a better overall heat conduction effect and improving the energy transfer efficiency.

Optionally, in combination with what is shown in FIG. 9, the heating body 92 is a heating semiconductor. The heating semiconductor is controlled by the second circuit board 91 to perform heating work.

Heating of the heating semiconductor is a result of applying the thermoelectric effect. When a current passes through the heating semiconductor, heat is generated at one end, and the other end cools down to generate a temperature difference. Namely, one end is heated and the other end is refrigerated. The heating end of the heating semiconductor is connected to the second conductive sheet 93.

Optionally, in combination with what is shown in FIG. 1, FIG. 8 and FIG. 9, the driving assembly 3 includes a driving motor 31 and an eccentric wheel 32 connected to the driving motor 31. The eccentric wheel 32 is connected to the movable cutter 21. A battery 6 for supplying power to the second circuit board 91 and the driving motor 31 is disposed in the machine body 1.

The battery 6 is a rechargeable battery 6. The eccentric wheel 32 is connected to a motor shaft of the driving motor 31. When the driving motor 31 works, the eccentric wheel 32 is driven to move. The eccentric wheel 32 drives the movable cutter 21 to perform a reciprocating motion with respect to the fixed cutter 22 so as to achieve a hair cutting operation. The second circuit board 91 is electrically connected to the driving motor 31. The second circuit board 91 controls the driving motor 31 to work.

Optionally, in combination with what is shown in FIG. 1 and FIG. 8, the machine body 1 is further provided with a starting switch 7 and a heating button connected to the second circuit board 91. The heating function of the electric hair clipper is achieved by pressing the heating button.

The starting switch 7 is used for starting or turning off the driving motor 31. The heating button may be designed to control the heating structure 9 to perform heating work only after the starting switch 7 is turned on. The heating button may also be in an independent control design. That is to say, regardless of the state of the starting switch 7, the heating button may be directly pressed to control the heating structure 9 to perform heating work, so that the application range of the electric hair clipper is wider. The starting switch 7 and the heating button are both exposed and disposed on the surface of a housing of the machine body 1 to facilitate the user's operation. When it is necessary to heat the fixed cutter fixing member 23, the user presses down the heating button. The second circuit board 91 controls the heating body 92 to perform heating work. When a certain temperature is reached, the energy on the heating body 92 is conducted to the second copper sheet 94. The second copper sheet 94 transfers the energy to the second conductive sheet 93. The second conductive sheet 93 conducts the energy to the fixed cutter fixing member 23. Finally the temperature of the fixed cutter fixing member 23 rises.

Optionally, in combination with what is shown in FIG. 4, FIG. 5, FIG. 8 and FIG. 9, the fixed cutter fixing member 23 includes a skin-contacting portion 231 and connecting portions 232, which are connected to each other. The fixed cutter 22 is provided with a hollowed-out portion 221 for mounting the skin-contacting portion 231. The fixed cutter fixing member 23 is separately connected to the fixed cutter 22 and the machine body 1 through the connecting portions 232. The skin-contacting portion 231 and the heating structure 9 are connected to each other in a manner of heat conduction.

The skin-contacting portion 231 is of a boss structure. The hollowed-out portion 221 matches the shape of the skin-contacting portion 231. When the skin-contacting portion 231 is mounted to the hollowed-out portion 221, the outer surface of the skin-contacting portion 231 is flush with the outer surface of the fixed cutter 22. The outer surfaces here refer to surfaces in contact with the scalp, so that the fixed cutter 22 may slide smoothly relative to the scalp during hair cutting. In this embodiment, the hollowed-out portion 221 for mounting the skin-contacting portion 231 is disposed on the fixed cutter 22 so as to make full use of the space of the fixed cutter 22, so that the overall structure is compact and the space occupied is as small as possible.

Although the present disclosure has been described above, the scope of protection of the present disclosure is not limited thereto. Various changes and modifications may be made by those skilled in the art without departing from the spirit and scope of the present disclosure, and such changes and modifications fall within the scope of protection of the present disclosure.

What is claimed is:

1. An electric hair clipper with a temperature changing function, comprising a machine body (1) and a cutter head (2) connected to each other, the cutter head (2) comprising a movable cutter (21), a fixed cutter (22) and a fixed cutter fixing member (23), a driving assembly (3) for driving the movable cutter (21) to reciprocate being disposed in the machine body (1), a hollowed out portion disposed within the fixed cutter (22) extending from an end of the fixed cutter, opposite a cutting blade portion, in a direction toward the cutting blade portion, the fixed cutter being connected to the machine body (1) through coupling the fixed cutter fixing member (23) to the hollow-out portion, and the fixed cutter fixing member (23) being adapted to be in direct contact with the scalp of a user when hair is cut; a heat transfer structure (4) for heating and refrigerating being further disposed in the machine body (1), and the heat transfer structure (4) and the fixed cutter fixing member (23) being connected to each other in a manner of heat conduction; or a refrigerating structure (8) being further disposed in the machine body (1), and the refrigerating structure (8) and the fixed cutter fixing member (23) being connected to each other in a manner of heat conduction; or a heating structure (9) being further disposed in the machine body (1), and the heating structure (9) and the fixed cutter fixing member (23) being connected to each other in a manner of heat conduction.

2. The electric hair clipper with a temperature changing function according to claim 1, wherein the fixed cutter fixing member (23) and the fixed cutter (22) are connected to each other in a manner of heat conduction.

3. The electric hair clipper with a temperature changing function according to claim 1, wherein the fixed cutter fixing member (23) comprises a skin-contacting portion (231) and connecting portions (232), which are connected to each other, the fixed cutter (22) is provided with a hollowed-out portion (221) for mounting the skin-contacting portion (231) is mounted in the hollowed out portion, the fixed cutter fixing member (23) is separately connected to the fixed cutter (22) and the machine body (1) through the connecting portions (232), and the skin-contacting portion (231) and the heat transfer structure (4) are connected to each other in a manner of heat conduction; or, the skin-contacting portion (231) and the refrigerating structure (8) are connected to each other in a manner of heat conduction; or, the skin-contacting portion (231) and the heating structure (9) are connected to each other in a manner of heat conduction.

4. The electric hair clipper with a temperature changing function according to claim 3, wherein the machine body (1) is provided with sliding rails (11), and each of the connecting portions (232) is provided with a sliding block (2321) cooperating with the corresponding sliding rail (11); and a tap position adjusting assembly (5) for adjusting mutual positions between the sliding block (2321) and the sliding rail (11) is further disposed.

5. The electric hair clipper with a temperature changing function according to claim 1, wherein the fixed cutter fixing member (23) is made of an aluminum material.

6. The electric hair clipper with a temperature changing function according to claim 1, wherein the heat transfer structure (4) comprises a circuit board (41) and a heating and refrigerating body (42) electrically connected to the circuit board (41), and the heating and refrigerating body (42) is connected to the fixed cutter fixing member (23) in a manner of heat conduction.

7. The electric hair clipper with a temperature changing function according to claim 6, wherein a conductive sheet (43) is disposed between the heating and refrigerating body (42) and the fixed cutter fixing member (23), and the heating and refrigerating body (42), the conductive sheet (43) and the fixed cutter fixing member (23) are connected in a manner of heat conduction in sequence.

8. The electric hair clipper with a temperature changing function according to claim 7, wherein the conductive sheet (43) is an aluminum block, the heat transfer structure (4) further comprises a copper sheet (44), and the copper sheet (44) is disposed between the conductive sheet (43) and the heating and refrigerating body (42).

9. The electric hair clipper with a temperature changing function according to claim 6, wherein the circuit board (41) is provided with a current direction switch for controlling the heating and refrigerating body (42) to switch between heating work and refrigerating work; or, the heating and refrigerating body (42) comprises a heating semiconductor and a refrigerating semiconductor, and the heating semiconductor and the refrigerating semiconductor are separately controlled by the circuit board (41) to perform the heating work and the refrigerating work.

10. The electric hair clipper with a temperature changing function according to claim 6, wherein the driving assembly (3) comprises a driving motor (31) and an eccentric wheel (32) connected to the driving motor (31), the eccentric wheel (32) is connected to the movable cutter (21), and a battery (6) for supplying power to the circuit board (41) and the driving motor (31) is disposed in the machine body (1).

11. The electric hair clipper with a temperature changing function according to claim 1, wherein the refrigerating structure (8) comprises a first circuit board (81) and a refrigerating body (82) electrically connected to the first circuit board (81), and the refrigerating body (82) is connected to the fixed cutter fixing member (23) in a manner of heat conduction.

12. The electric hair clipper with a temperature changing function according to claim 11, wherein a first conductive sheet (83) is disposed between the refrigerating body (82) and the fixed cutter fixing member (23), and the refrigerating body (82), the first conductive sheet (83) and the fixed cutter fixing member (23) are connected in a manner of heat conduction in sequence.

13. The electric hair clipper with a temperature changing function according to claim 12, wherein the first conductive sheet (83) is an aluminum block, the refrigerating structure (8) further comprises a first copper sheet (84), and the first copper sheet (84) is disposed between the first conductive sheet (83) and the refrigerating body (82).

14. The electric hair clipper with a temperature changing function according to claim 11, wherein the refrigerating body (82) is a refrigerating semiconductor, and the refrigerating semiconductor is controlled by the first circuit board (81) to perform refrigerating work; and a first heat dissipation member (85) is connected to the refrigerating semiconductor.

15. The electric hair clipper with a temperature changing function according to claim 11, wherein the driving assembly (3) comprises a driving motor (31) and an eccentric wheel (32) connected to the driving motor (31), the eccentric wheel (32) is connected to the movable cutter (21), and a battery (6) for supplying power to the first circuit board (81) and the driving motor (31) is disposed in the machine body (1).

16. The electric hair clipper with a temperature changing function according to claim 1, wherein the heating structure (9) comprises a second circuit board (91) and a heating body (92) electrically connected to the second circuit board (91), and the heating body (92) is connected to the fixed cutter fixing member (23) in a manner of heat conduction.

17. The electric hair clipper with a temperature changing function according to claim 16, wherein a second conductive sheet (93) is disposed between the heating body (92) and the fixed cutter fixing member (23), and the heating body (92), the second conductive sheet (93) and the fixed cutter fixing member (23) are connected in a manner of heat conduction in sequence.

18. The electric hair clipper with a temperature changing function according to claim 17, wherein the second conductive sheet (93) is an aluminum block, the heating structure (9) further comprises a second copper sheet (94), and the second copper sheet (94) is disposed between the second conductive sheet (93) and the heating body (92).

19. The electric hair clipper with a temperature changing function according to claim 16, wherein the heating body (92) is a heating semiconductor, and the heating semiconductor is controlled by the second circuit board (91) to perform heating work.

20. The electric hair clipper with a temperature changing function according to claim 16, wherein the driving assembly (3) comprises a driving motor (31) and an eccentric wheel (32) connected to the driving motor (31), the eccentric wheel (32) is connected to the movable cutter (21), and a battery (6) for supplying power to the second circuit board (91) and the driving motor (31) is disposed in the machine body (1).

* * * * *